June 11, 1963 R. K. EVANS 3,093,110
SILO UNLOADING APPARATUS
Filed Nov. 12, 1959 5 Sheets-Sheet 1

INVENTOR
RONALD K. EVANS
By Joseph Allen Brown
ATTORNEY

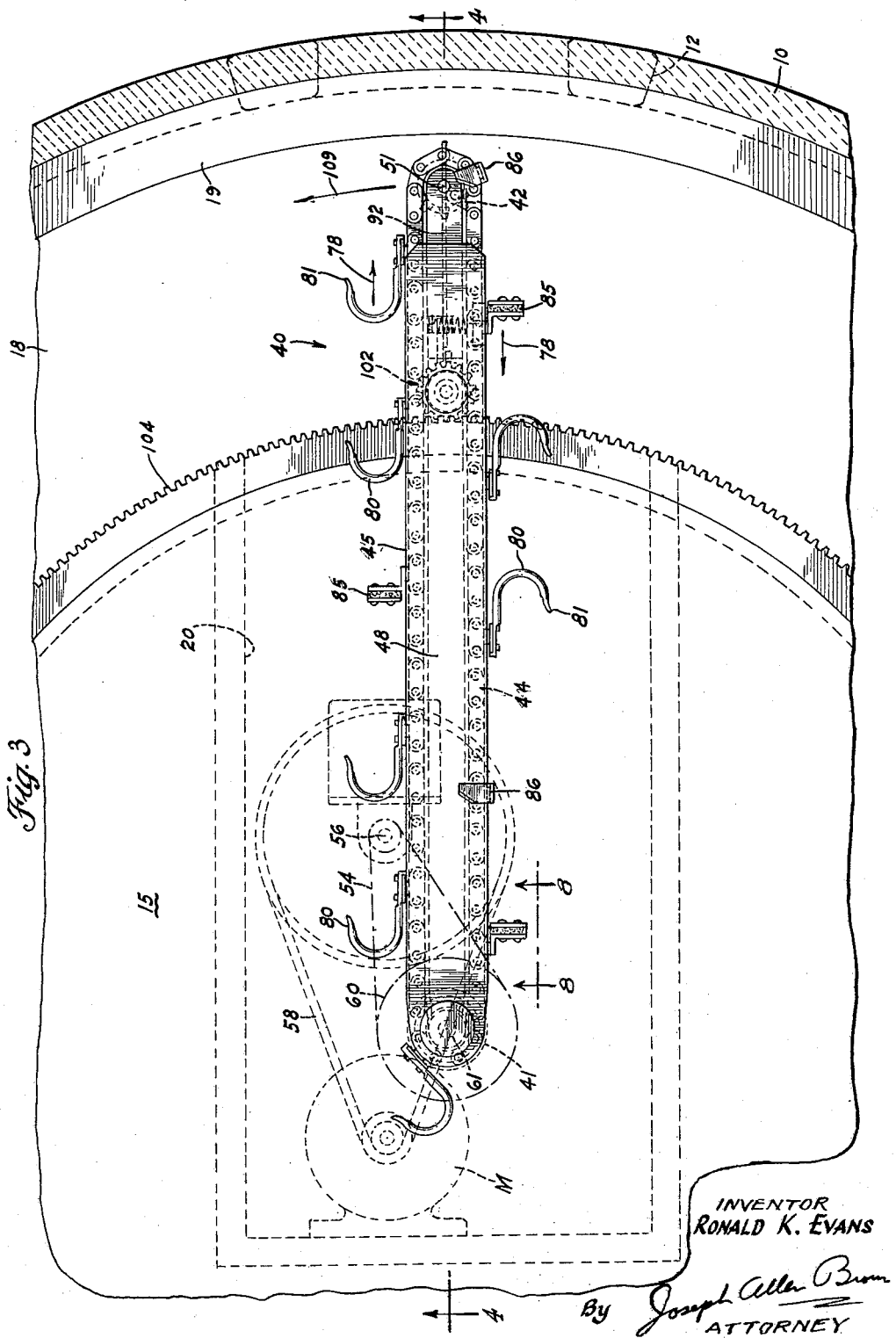

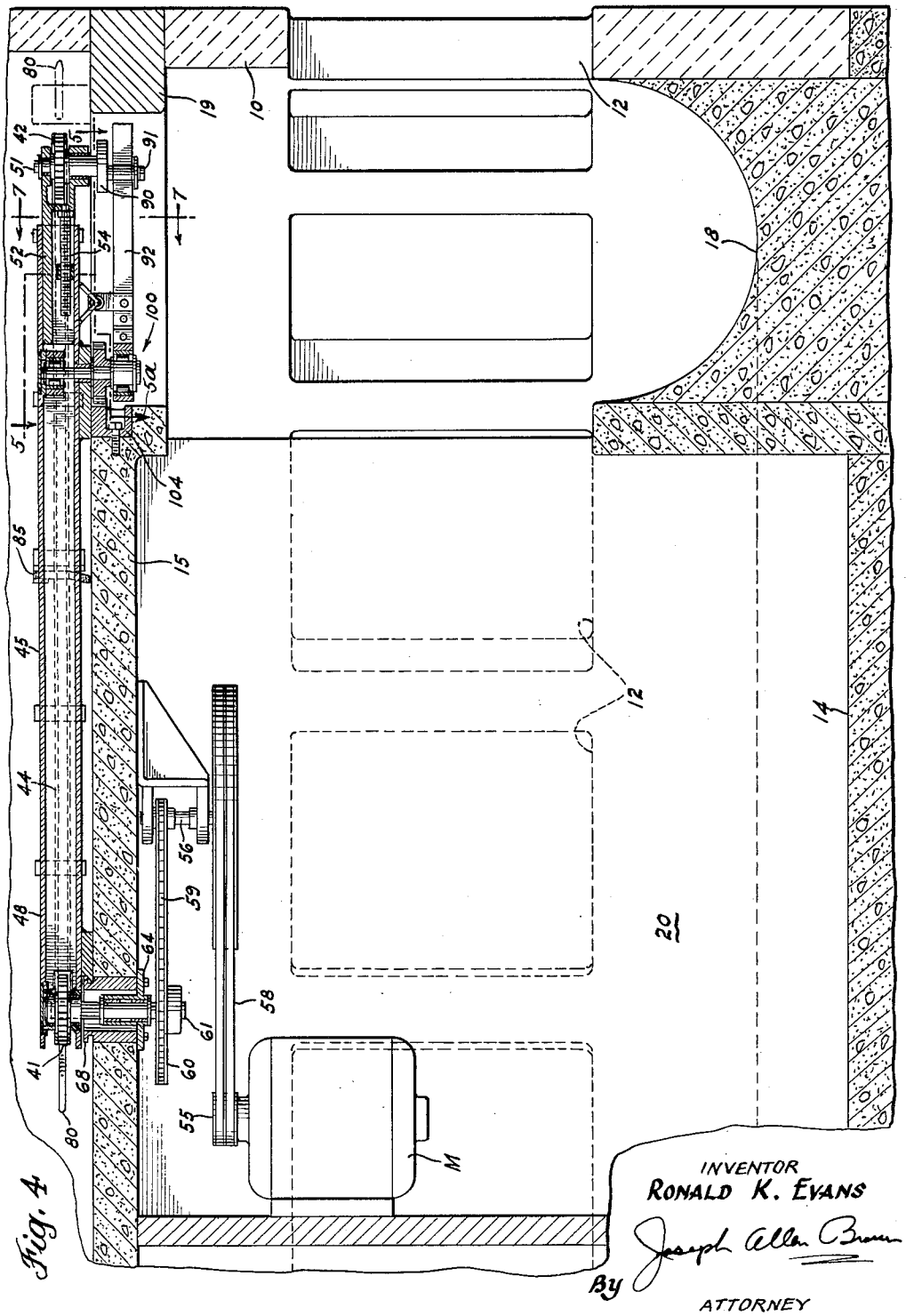

June 11, 1963   R. K. EVANS   3,093,110
SILO UNLOADING APPARATUS
Filed Nov. 12, 1959   5 Sheets-Sheet 4
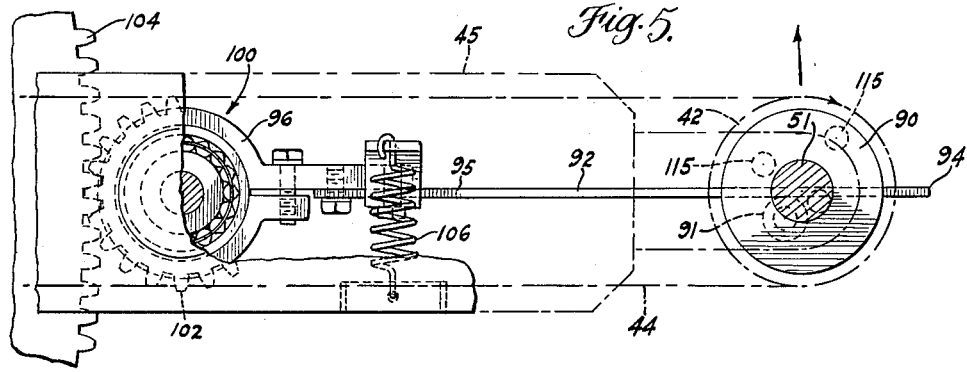
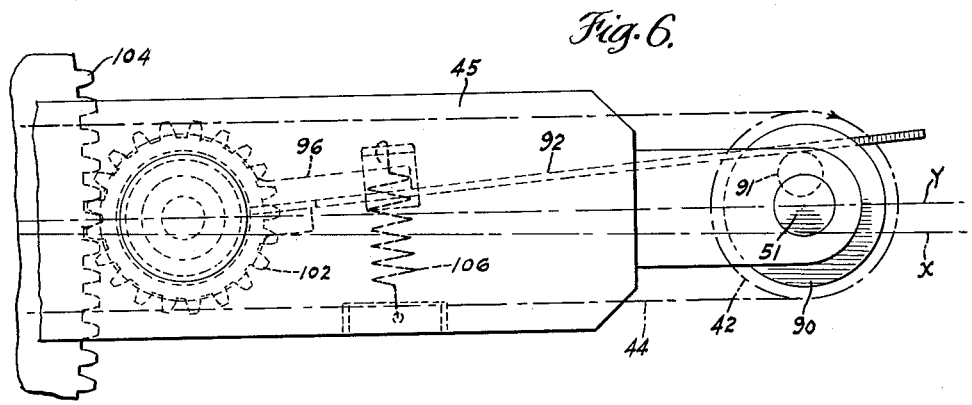
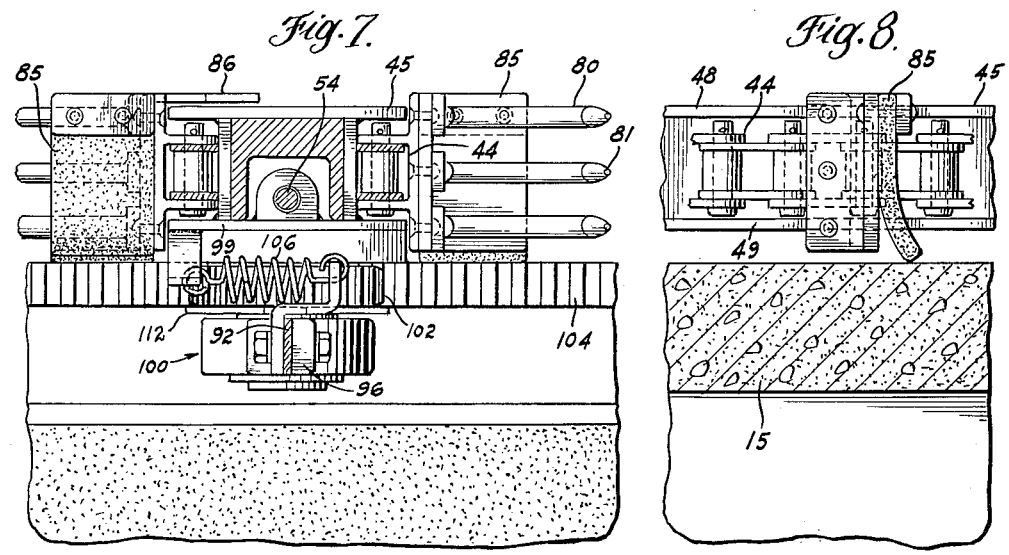
INVENTOR
RONALD K. EVANS
By Joseph Allen Brown
ATTORNEY

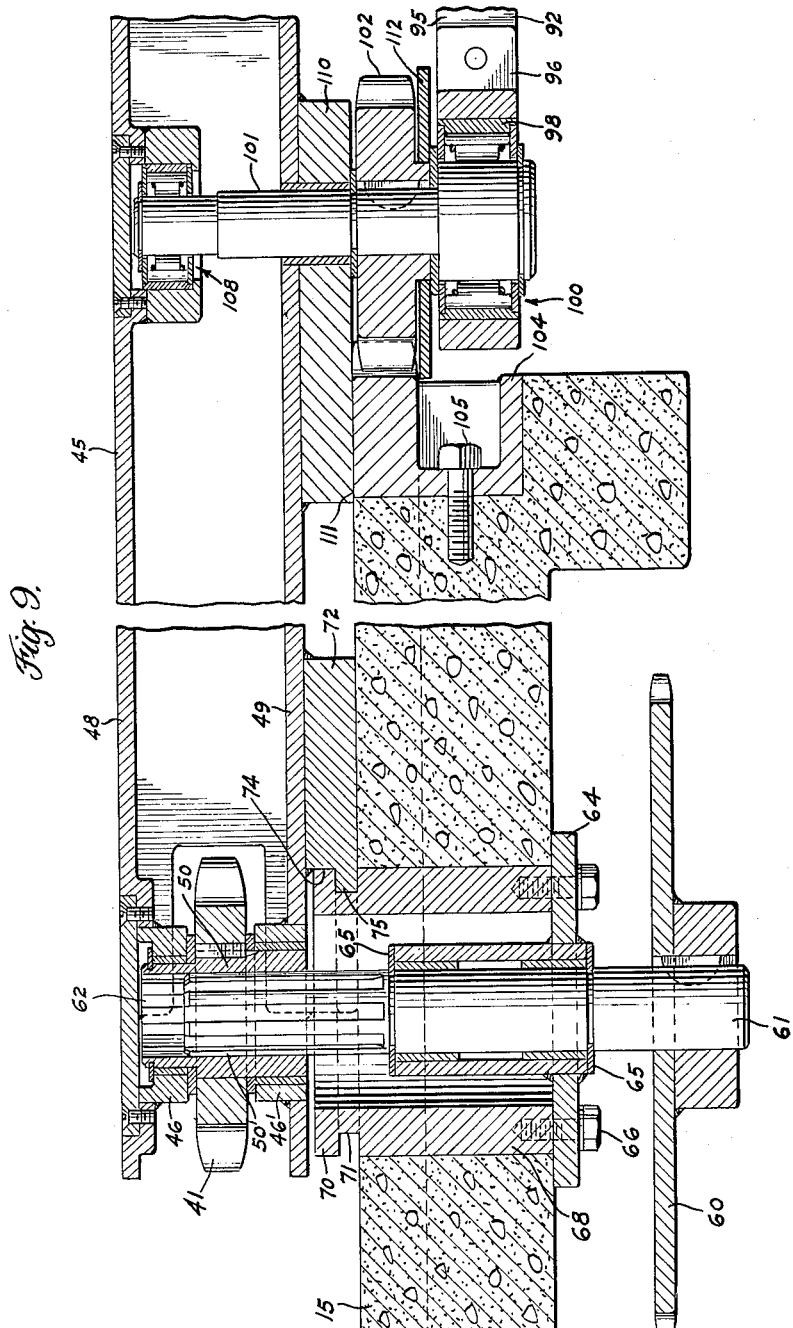

United States Patent Office 3,093,110
Patented June 11, 1963

3,093,110
SILO UNLOADING APPARATUS
Ronald K. Evans, Birmingham, Mich., assignor to Sperry Rand Corporation, New Holland, Pa., a corporation of Delaware
Filed Nov. 12, 1959, Ser. No. 852,388
10 Claims. (Cl. 119—52)

This invention relates generally to silos and more particularly to apparatus for automatically unloading silos.

A conventional silo comprises an upright cylindrical column adapted to receive and store crop material. Usually, the silo is filled using blower apparatus which directs material which has been chopped, shredded or the like into the silo from the top thereof. The crop material falls to the bottom of the silo and gradually builds up, layer after layer, until the structure is completely filled. A vertical chute is provided along the outside wall of the silo communicating with a series of doors disposed one above the other from the bottom to the top of the silo. Conventionally, the silo is unloaded by opening the topmost silo door and shoveling material through it whereupon the material will drop down through the chute to ground level where it can be distributed for feed. As the level of the ensilage drops in the silo, each door can be opened in turn to provide a handy opening for discharging material.

One difficulty with a conventional silo structure is that the first material placed in the silo is the last material to be removed from it, which is undesirable. Therefore, unloading apparatus has been provided heretofore which operates in the bottom of a silo. Such apparatus comprises a sweep arm which swings around the vertical center of a silo and conveys material from the silo wall to the center of the structure where the material drops into an outlet opening and to a second conveyor which then moves the material radially outwardly for discharge beyond the periphery of the silo. Such structures are relatively difficult to build and still more difficult to repair if the sweep arm breaks down when the silo is full, since access cannot be had to it. Moreover, since the apparatus comprises a conveyor which first moves the material to the center of the silo and then a second conveyor which moves the material to the periphery of the silo, a very substantial amount of costly operative structure is required.

To overcome the problems in bottom unloading silos as described above, it has also been proposed to provide a silo structure having a plurality of angularly spaced openings around the bottom of the silo through which animals can extend their heads to feed from an annular trough inside the silo. A table is provided coaxially of the silo having a radially extending swing arm which operates to convey ensilage radially outwardly and deposit such material into the trough where it can be consumed. The drive means for the swing arm is carried on the arm and extends over the trough. While such a structure simplifies the unloading apparatus, other problems are created. Such apparatus, particularly the drive means therefor, is exposed to the acids and other deteriorating effects of the crop material in the silo. Moreover, the column of material in the silo is supported solely by the central table and has a tendency to hang down around the center table. When the swing arm operates it will slice off the overhang and deposit such material in chunks rather than in thoroughly broken up form. This is undesirable from a feed standpoint since if the chunks are packed hard or frozen, the animals will have difficulty consuming them. Still further, conventional bottom unloading apparatus makes no provision for proper operation when the ensilage in the silo is frozen or otherwise tightly compacted whereby a resisting force is directed against the unloading apparatus sufficient to damage it.

One object of this invention is to provide apparatus for unloading a silo from the bottom which is more efficient and more effective than bottom unloading apparatus available heretofore.

Another object of this invention is to provide bottom unloading apparatus which may be readily inserted in a silo after the silo has been filled to feed the silage downwardly therein.

Another object of this invention is to provide silo unloading apparatus of the character described wherein the drive means for operating the apparatus is disposed in an accessible place within the confines of the silo yet protected from the crop material in the silo.

Another object of this invention is to provide means in the silo for controlling and regulating the downward movement of material as the apparatus is operating.

A further object of this invention is to provide unloading apparatus which has a radially extending conveyor which is swingable about the vertical center of the silo, the drive means for swinging the conveyor including resilient means adapted to allow the drive to yield when a feeding resisting force is encountered exceeding a predetermined amount.

A still further object of this invention is to provide a silo structure adapted to receive means for forming a tunnel in the ensilage when the silo is loaded to provide access to the center of the silo.

A still further object of this invention is to provide unloading apparatus so constructed that a single conveyor mechanism may be used in a plurality of similarly constructed silos to selectively unload them.

A still further object of this invention is to provide unloading apparatus which is less expensive than comparative apparatus of prior design in cost of manufacture.

Other objects of this invention will be apparent hereinafter from the specification and from the recital in the appended claims.

In the drawings:

FIG. 3 is an enlarged fragmentary plan view showing in particular the endless conveyor of the unloading apparatus;

FIG. 4 is a longitudinal vertical section taken on the line 4—4 of FIG. 3 looking in the direction of the arrows;

FIG. 5 is an enlarged fragmentary plan section of the end portion of the endless conveyor taken generally on the lines 5—5 and 5—5a of FIG. 4 looking in the direction of the arrows, certain parts which lie in a plane above the planes of the section being shown in dot-dash lines;

FIG. 6 is a view similar to FIG. 5 but showing the parts in a different operative position;

FIG. 7 is an enlarged section taken on the line 7—7 of FIG. 4 looking in the direction of the arrows;

FIG. 8 is an enlarged fragmentary elevation taken on the line 8—8 of FIG. 3 looking in the direction of the arrows; and FIG. 9 is an enlarged fragmentary longitudinal section similar to FIG. 4 and showing in detail some of the components of the endless conveyor.

Figure 1:
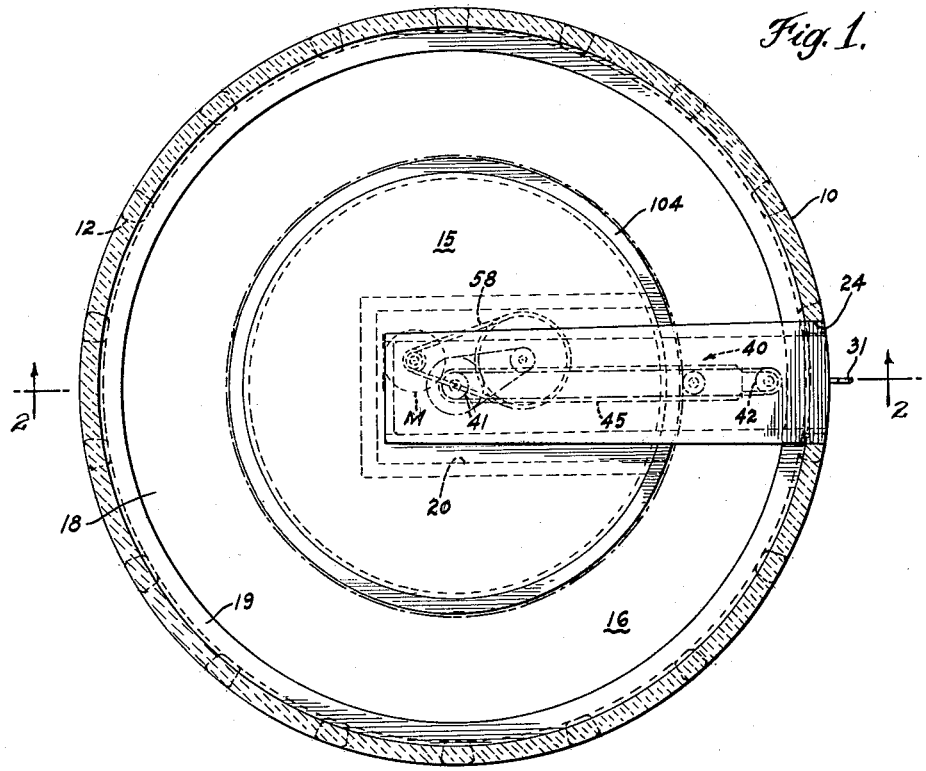
FIG. 1 is a horizontal section taken through a medial vertical portion of a silo having bottom unloading apparatus constructed according to this invention.
Figure 2:
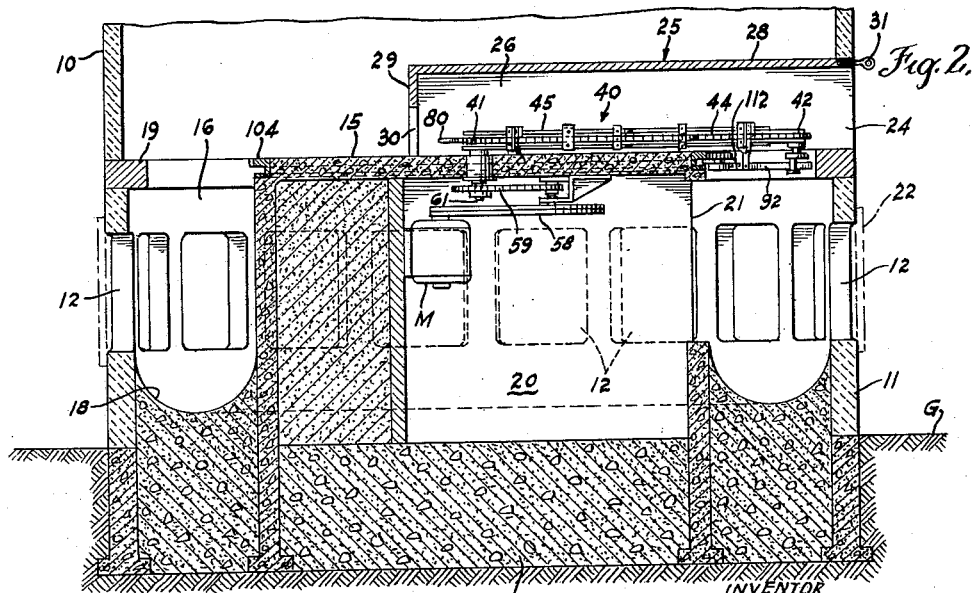
FIG. 2 is a vertical section taken on line 2—2 of FIG. 1 looking in the direction of the arrows.

Referring now to the drawings by numerals of reference and first to FIGS. 1 and 2, 10 denotes a cylindrical silo having a bottom portion 11 provided with a plurality of angularly spaced feed openings 12. Within the silo there is a base structure 14 and an upstanding cylindrical table 15 disposed concentrically with the axis of the silo. The top of table 15 is generally flat and the diameter of the table is less than the inside diameter of the silo thereby providing an annular space 16 which communicates with the openings 12. The lower portion of the space 16 forms a trough 18 which extends below the lower marginal edges of the openings 12. Positioned above the openings 12 and projecting inwardly of the silo is a shelf 19 the upper surface of which is in the same horizontal plane as the top of table 15. The shelf 19 closes off part of the space between the silo wall and the periphery of the table 15. It is provided to cooperate with the top of table 15 to support crop material in the silo and prevent material from hanging over the edge of the table. When silo 10 contains crop material, the lower portion of the mass is compressed by the weight of the material above it. The table 15 and shelf 19 support the column, the material over the annular space 16 bridging such space. Since overhang is prevented, the operation of the unloading conveyor, subsequently described, is improved.

Preferably, although not necessarily, the silo is constructed of concrete, including table 15 and trough 18. In building the silo, a compartment 20 is formed beneath and within the table 15 having an inlet opening 21 communicating with the trough 18. A person can obtain access to the inside of compartment 20 by climbing through one of the feed openings 12 and then through the opening 21. To protect the trough 18 from the weather and to keep air out of the bottom of the silo, suitable closures or doors 22 may be provided to block off the feed openings. The structure of the silo is such relative to the ground level G that animals can stand on the ground and project their heads through the openings 12 and feed from the feed trough 18.

Angularly aligned with the opening 21 in compartment 20 is an opening 24 in the side wall of the silo and above the shelf 19. Projectable through this opening and extending beyond the vertical center of the silo is a hood 25 having vertical side walls 26, a top wall 28 and an inner wall 29. The size of the hood 25 is such relative to the opening 24 that the hood can be inserted into or extracted from the silo by sliding it radially through the opening 24 or pulling it radially out of the opening. The inner wall 29 has a lower edge spaced from the top of the table 15 to provide an opening 30. As shown best in FIG. 1, the hood is tapered from its outer to its inner end. An eye 31 is connected to the hood so that a rope, chain or the like can be connected thereto so that power means can be used to pull the hood from the silo when it is desired to do so.

Hood 25 is provided and adapted to be used when the silo 10 is to be filled with crop material. With the hood in position, as shown in FIGS. 1 and 2, when crop material is fed into the silo from the top of the structure, it falls downwardly therein and completely fills the space between the side walls of the silo and buries the hood 25. When initially filled, trough 18 and annular space 16 is also completely filled with material. However, when given access to the silo, the cattle quickly clear this space of material. When the silo is completely full the crop material is tightly packed around the hood and the hood provides a tunnel giving access to the center of the silo and the top of table 15.

For automatically delivering material downwardly in the silo 10 and into trough 18 conveying apparatus 40 is provided. The conveyor is insertable into the silo through the opening 24 and beneath the hood 25. When the conveyor is in place, the hood is adapted to be removed to give the conveyor access to the crop material in the silo. Conveyor 40 has an inner sprocket 41 and an outer sprocket 42 rotatable about spaced parallel vertical axes. Inner sprocket 41 is disposed coaxial with the vertical axis of the silo and with the center of the table 15. Outer sprocket 42 is positioned above feed trough 18. Extending around the respective sprockets is an endless member 44 in the form of a chain.

Both sprockets are rotatably carried on a support arm 45. The inner sprocket 41 is mounted as best shown in FIG. 9 for rotation between two axially spaced bearing members 46 and 46' welded to top plate 48 and bottom plate 49 of the arm 45. Sprocket 41 has an inner tubular member 50 affixed to it having internal gear teeth 50'. Outer sprocket 42 has a shaft 51 rotatably connected to the outer end of arm 45. Arm 45 has an extension section 52 (FIG. 4) adjustable toward and away from the main portion of the arm by means of threaded member 54 whereby the tightness of the chain 44 can be adjusted.

Suitably mounted beneath the table 15 is a motor M having an output shaft 55 (FIG. 4) connected to a shaft 56 through endless belts 58. Shaft 56 operates through an endless chain 59 to drive a sprocket 60 keyed to a stub shaft 61. Shaft 61 extends upwardly through table 15 (FIG. 9) having an upper splined end 62 projecting through member 50 of sprocket 41 with the teeth on the respective members intermeshing. Shaft 61 is connected to a plate 64 by means of snap rings 65. Plate 64 is connected by bolts 66 to a sleeve 68 rigid with the table 15. This sleeve has an upwardly projecting portion 70 formed with an annular groove 71. Connected to the lower plate 49 of arm 45 is a bearing member 72 which, when viewed in plan, has a semi-cylindrical pocket 74 having a tongue 75 adapted to fit into the groove 71. The member 72 prevents vertical movement of the inner end of conveyor 40 relative to table 15 and provides a support for the inner end of the conveyor 40 on the table.

When the conveyor is slid into the silo through opening 24 toward the upwardly projecting portion 70 of sleeve 68, the member 72 comes in contact with the sleeve and causes the inner end of the conveyor to be properly centered and oriented relative thereto. While the member 72 provides a centering means between the conveyor and the sleeve, it does not form a radial connection therewith and allows the conveyor to be radially extracted relative to the sleeve. The conveyor is prevented from being withdrawn from the silo when the shaft 61 is projected upwardly through the sprocket 41 but is free to be removed when the fastening bolts 66 have been removed and the shaft 61 has been pulled vertically downwardly to slide the splined section 62 out of the member 50. It will thus be seen that the conveyor 40 may be mounted in the silo 10 even when the silo is full by sliding it through the opening 24 and beneath the hood 25 until the member 72 engages the sleeve 68. Then the shaft 61 may be projected upwardly from compartment 20 through table 15 and into sprocket 41 to provide a driving connection therewith. It will be understood, of course, that trough 18 will have been cleared out by the feeding animals to provide access to the compartment 20. Also, hood 25 will be removed before the conveyor is operated.

When the motor is started, drive is transmitted to the belts 58, shaft 56, chain 59 and shaft 61 to the inner sprocket 41. The rotation of the inner sprocket 41 is imparted to the endless chain 44 which is caused to move as indicated by the arrows 78 in FIG. 3. The movement of the endless member 44 causes the outer sprocket 42 to rotate.

Endless member 44 has connected to it rake fingers 80 which extend in a horizontal plane and have outwardly projecting points 81 adapted to dig into the ensilage in the silo 10 and on top of the table 15 and convey such material outwardly relative to the table and deposit the material in the trough 18. The outer free ends 81 at least of the hooks 80 have some resiliency whereby the members flex and comb the material from the mass of silage in the structure. Interposed at various points on the endless chain 44 are wiper members 85, shown in detail in FIG. 8, which have slidable engagement with the top of the table 15 to sweep the table clean of crop material as the conveyor operates. The wiper members 85 may be made of any suitable material having some flexibility and considerable resistance to wear. Also connected to the endless chain 44 are outwardly, then upwardly and then inwardly extending scraper members 86 which travel across the surface of the top plate 48 of the arm 45 to continually scrape material therefrom. Such scraping action tends to keep the top of the conveyor arm free of ensilage.

While the inner sprocket 41 provides the drive for operating the conveyor 40, to cause the conveyor members 80 to move crop material into trough 18, the drive means for indexing the conveyor about the axis of the inner sprocket 41 is provided from the outer sprocket 42. As shown in FIG. 4, the lower end of shaft 51, which carries the sprocket 42, has a plate 90 connected to it. Plate 90 is provided with a downwardly extending eccentric member 91. The eccentric member 91 has a lever arm 92 in engagement with it and as member 91 swings around with each revolution of the shaft 51, it causes arm 92 to be pivoted.

The lever arm 92 is in the form of a leaf spring having a free outer end 94 and an inner end 95 connected by clamp means 96 to the outer race 98 of a sprag clutch 100 (FIG. 9). Sprag clutch 100 is keyed to a vertically extending shaft 101 and is capable of rotating the shaft 101 in a counterclockwise direction only when the shaft is viewed from above. Each time the eccentric member 91 pivots the lever arm 92 from the position shown in FIG. 5 to the position shown in FIG. 6, it causes the sprag clutch 100 to rotate a given angular amount. Such rotation is transmitted to the shaft 101 and from there to a pinion 102 keyed to the shaft and having teeth meshing with the teeth of a ring gear 104 connected to the periphery of table 15 by fastening members 105. The eccentric member 91 is adapted to move the lever 92 a sufficient distance to cause pinion 102 to rotate and index the endless conveyor 40 a distance equal to the space between the dotted lines X and Y in FIG. 6. A tension spring 106 is connected between lever 92 and the conveyor arm 45 which constantly holds the lever arm in engagement with the eccentric member 91. Thus, when the eccentric member 91 swings between the portions shown in FIGS. 5 and 6, the spring 106 causes the arm 92 to follow it. While the sprag clutch 100 drives the shaft 101 in one direction, it is freely rotatable in the opposite direction thereby allowing the spring 106 to return the lever arm to the position shown in FIG. 5.

To prevent any reverse rotation of the pinion 102, a second sprag clutch 108, FIG. 9, is provided on the upper shaft 101 and connected to the arm 45. Sprag clutch 108 is reversely mounted relative to the lower sprag clutch 100. Sprag clutch 108 allows the shaft 101 to freely rotate in a counterclockwise direction when the shaft is viewed from above but prevents the shaft from rotating in a clockwise direction. Thus, when the lever arm 92 pivots, it operates through the sprag clutch 100 to rotate the pinion 102 counterclockwise, the sprag clutch 108 offering no resistance to such rotation of the shaft 101. However, once the sprocket 102 has been rotated, the upper sprag clutch refuses to allow the shaft to rotate in the opposite direction. At the same time, the lower sprag clutch being reversely mounted offers no resistance to the return of the lever arm 92 to its original position by the spring 106.

With each pivoting of lever 92, conveyor 40 is indexed and caused to swing about the axis of sprocket 41 and in the direction indicated by the arrow 109 in FIG. 3. As the outer end of the conveyor swings, a bearing plate 110 welded to the underside of the outer end of arm 45 slides on the top surface 111 of ring gear 104. Plate 110 and the gear 104 thus support the outer end of the conveyor. In addition to plate 110, a second plate 112 is provided for engagement with the ring gear 104. Plate 112 slidably engages the undersides of the inner ends of the teeth on the ring gear and thus prevents upward movement of the outer end of the conveyor relative to the table 15. Thus, while member 72 restricts upward movement of the inner end of conveyor 40, plate 112 prevents upward movement of the outer end.

Since the lever arm 92 is in the form of a leaf spring, if the crop material in the silo is frozen or otherwise immovable, the lever arm is able to yield and pivot about the clamp 96 when swung by eccentric 91. Therefore the conveyor is allowed to remain at rest and permit the hooks 80 to work on the crop material until enough has been cleared away to allow the conveyor to be indexed to the next station.

As shown in FIG. 5, the plate 90 has a plurality of holes 115 for the connection of the eccentric member 91. These holes are disposed at varying radial distances from the axis of shaft 51. It will be apparent, therefore, that by varying the position of the eccentric member 91 the throw imparted to the lever arm 92 can be varied and thus the amount of rotation of the shaft 101 and pinion 102 to thereby set up an indexing movement of the conveyor 40 in desired increments.

*Operation*

Under normal circumstances, conveyor 40 remains in the silo at all times and operatively connected to the motor M and ring gear 104. To protect the conveyor while the silo is being filled with crop material, hood 25 is placed as shown in FIGS. 1 and 2. The material becomes packed around the hood and a radial tunnel is formed in the bottom of the crop material column extending from opening 24 to the center of table 15. When it is desired to unload the silo, hood 25 is removed by connecting a cable or the like between a tractor and eye member 31 and then pulling the hood radially outwardly. Due to its taper, the hood will slide out easily, after initial movement, outwardly relative to the crop material.

After hood 25 has been extracted, motor M is started using a suitable switch, not shown, outside the silo. Power is transmitted to the inner sprocket 41 through belts 58, shaft 56, chain 59 and splined shaft 61. Inner sprocket 41 causes endless member 44 to move as indicated by the arrows 78 in FIG. 3. The movement of member 44 rotates outer sprocket 42, which in turn rotates shaft 51. The rotation of shaft 51 rotates plate 90 and the eccentric 91 thereon whereby lever arm 92 is pivoted back and forth. With each swing of arm 92 from the portion shown in FIG. 5 to the portion shown in FIG. 6, the pinion 102 is rotated. This causes conveyor 40 to be indexed in the direction of the arrow 109 in FIG. 3. The amount of angular movement of the conveyor is determined by the throw of arm 92 as determined by the connection of the eccentric 91 to the plate 90. The spring 106 holds arm 92 against eccentric 91 at all times whereby after a pivoting movement (FIG. 6) the parts return to the position shown in FIG. 5.

As conveyor 40 moves angularly about the center of the silo, the hooks 80 comb material from the mass and convey it to the annular space 16 where it drops into the trough 18. Material above table 15 is moved radially outwardly. Material above space 16 is merely combed free so that it will drop down. Material over shelf 19 is swept inwardly from the shelf as the hooks 80 swing around sprocket 42 and over the shelf (FIG. 4).

The conveyor 40 is left in operation until a desired amount of crop material has been deposited in trough 18. Then the animals are allowed to feed therefrom through the openings 12. Generally, one trip of conveyor 40 around the axis of center sprocket 41 is sufficient to fill trough 18. Thus, an automatic shut-off switch can be provided to stop the conveyor after one 360° swing.

With each 360° movement of conveyor 40 a layer of material is removed from the bottom of the forage mass. As material is cut away and deposited in trough 18, the column of material in the silo will drop down, such downward movement being controlled and restricted by the cooperative action of table 15 and shelf 19.

Since the drive for the conveyor is beneath table 15 in compartment 20 it is protected from the acids and other damaging actions of the crop material in the silo. Moreover, the drive conveyor 40 can be disconnected at any time from beneath table 15.

Although the structure described may be employed as a single unit, a silo system can be provided having several silos each of which can be unloaded using a single conveyor 40. Each silo in the system would be built as described and filled with a hood 25 in place to form a tunnel to the center of the silo. The conveyor could be inserted into whichever silo the operator desired to unload. The conveyor would be slid radially inwardly through opening 24 until member 72 engaged sleeve 68. The pocket 74 would align the inner end of the conveyor relative to the center of the table. Once shaft 61 was projected up through inner sprocket 41 a drive means to the conveyor would be provided. After the removal of hood 25 the silo could be used for self-feeding. When empty, conveyor 40 could be moved to the next silo to unload it, and so on. Thus, one conveyor could be used to bottom unload several silos.

The reversely mounted sprag clutches 100 and 108 on the conveyor insure positive rotation of the pinion 102 with each stroke of arm 92 and no reverse rotation. However, since arm 92 is a spring arm, if a force in excess of a predetermined amount is encountered by conveyor 40 resisting its indexing, for example if the silage is frozen, then arm 92 will yield on a working stroke. All the while, hooks 80 will work in the silage and ultimately enough will be cleared away to allow the conveyor to be indexed to the next station. Thus, a safety means is incorporated providing proper operation of the conveyor under all conditions.

While this invention has been described in connection with a particular embodiment thereof, it will be understood that it is capable of further modification, and this application is intended to cover any variations, uses or adaptations of the invention following in general, the principles of the invention and including such departures from the present disclosure as come within known or customary practice in the art to which the invention pertains and as fall within the scope of the invention or the limits of the appended claims.

Having thus described my invention, what I claim is:

1. Apparatus of the character described comprising a horizontally extending circular feed table surrounded in part at least by a feed trough, a ring gear connected to said table and extending around the periphery thereof, an endless conveyor having an inner sprocket mounted on said table at the center thereof for rotation on a fixed axis and an outer sprocket disposed beyond the periphery of said table, said sprockets being rotatable on parallel, vertical axes, the axis of rotation of said inner sprocket being fixed and of said outer sprocket movable, drive means rotating said inner sprocket and through said endless conveyor member said outer sprocket, means carried on said table supporting said outer sprocket for arcuate movement relative to the table, a pinion rotatable on a vertical axis, said pinion having teeth meshing with the teeth of said ring gear, a shaft to which said pinion is fastened, means connecting said shaft to said outer sprocket supporting means, a first means connected to said shaft and through which the shaft may be rotated in one direction only, a second means interconnected between said shaft and said supporting means locking said shaft against movement in a direction opposite to said one direction only, and means connected between said outer sprocket and said first means for intermittently rotating said pinion in said one direction.

2. Apparatus as recited in claim 1 wherein said first and second means comprise first and second sprag clutches reversely mounted.

3. Apparatus as recited in claim 2 wherein said intermittent drive means includes an eccentric member connected to said outer sprocket and rotatable therewith.

4. Apparatus as recited in claim 3 wherein said intermittent drive means also includes a lever arm having one end connected to said first sprag clutch and an opposite end engageable with said eccentric member.

5. Apparatus as recited in claim 4 wherein a spring is connected between said lever arm and said outer sprocket supporting means constantly biasing the arm into engagement with said eccentric member.

6. Apparatus as recited in claim 5 wherein said lever arm comprises a leaf spring.

7. Apparatus as recited in claim 6 wherein said eccentric member is adjustable relative to said outer sprocket to vary the throw imparted thereby to said lever arm.

8. Apparatus for feeding material downwardly in a cylindrical silo having a plurality of circumferentially spaced feed openings in a bottom wall portion thereof and a generally circular horizontal feed table mounted within the silo at the bottom thereof concentrically therewith, the diameter of the table being less than the inside diameter of the silo and forming a feed trough between the table and said bottom wall portion access to which may be had through said feed openings, comprising a conveyor operative on top of said table, said silo having an access door above said feed openings through which said conveyor may be extracted from the silo, said conveyor having an inner sprocket and an outer sprocket rotatable about vertical axes, said inner sprocket being located at substantially the center of the said table and said outer sprocket being disposed over said trough, an endless chain connecting said sprockets, feed hooks having inner ends connected to said chain and projecting laterally outwardly therefrom to material engaging free ends, drive means beneath said table and detachably connected to said inner sprocket to drive said chain whereby said hook free ends comb material on said table and convey it radially outwardly and into said feed trough, a compartment beneath said table large enough to receive an operator and provide access to said inner sprocket even though a column of material is above said table, said chain being driven by said inner sprocket and the chain operating to drive the outer sprocket, and means interconnected between said outer sprocket and said table and operative responsive to rotation of the outer sprocket to index said conveyor about said inner sprocket, said indexing means including a resilient element which yields when the force required to index said conveyor exceeds a given amount thereby protecting the conveyor from damage.

9. Apparatus for feeding material as recited in claim 8 wherein said silo has a shelf projecting inwardly from the inside of the silo above said trough and terminating short of the periphery of the table, said table and shelf having flat top surfaces disposed in substantially a common horizontal plane and being cooperative to support material in the silo.

10. Apparatus for feeding material as recited in claim 9 wherein said feed hooks of said conveyor travel over said shelf as well as over said table and operate to move material radially inwardly of the silo.

References Cited in the file of this patent

UNITED STATES PATENTS

| | | |
|---|---|---|
| 1,301,051 | Hart | Apr. 15, 1919 |
| 2,665,015 | Best | Jan. 5, 1954 |
| 2,752,884 | Mazur | July 3, 1956 |
| 2,755,771 | Martin | July 24, 1956 |
| 2,764,320 | Broberg et al. | Sept. 25, 1956 |
| 2,861,544 | Baltz | Nov. 25, 1958 |
| 2,914,198 | Hein | Nov. 24, 1959 |
| 2,969,156 | Miller et al. | Jan. 24, 1961 |